United States Patent
Watada et al.

(10) Patent No.: US 12,417,765 B2
(45) Date of Patent: Sep. 16, 2025

(54) CONFERENCE SERVER AND CONFERENCE SYSTEM

(71) Applicant: TOSHIBA TEC KABUSHIKI KAISHA, Tokyo (JP)

(72) Inventors: Shogo Watada, Shizuoka (JP); Naoki Sekine, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 17/965,807

(22) Filed: Oct. 14, 2022

(65) Prior Publication Data

US 2023/0252985 A1   Aug. 10, 2023

(30) Foreign Application Priority Data

Feb. 4, 2022   (JP) .................................. 2022-016517

(51) Int. Cl.
*G10L 15/22* (2006.01)
(52) U.S. Cl.
CPC .................... *G10L 15/22* (2013.01)
(58) Field of Classification Search
CPC .................. G10L 15/22; G06F 3/167
USPC ........................ 704/231, 246, 251
See application file for complete search history.

(56) References Cited

U.S. PATENT DOCUMENTS

| 2015/0088514 A1 | 3/2015 | Typrin |
| 2019/0333503 A1 | 10/2019 | Kumetani |
| 2023/0115674 A1* | 4/2023 | Nighman ............... H04R 3/005 |
| | | 381/58 |

FOREIGN PATENT DOCUMENTS

CN          110971749          4/2020

OTHER PUBLICATIONS

Japanese Office Action for Japanese Patent Application No. 2022-016517 dated Apr. 22, 2025.

* cited by examiner

*Primary Examiner* — George C Monikang
(74) *Attorney, Agent, or Firm* — Amin, Turocy & Watson, LLP

(57) ABSTRACT

A conference server includes a processor configured to acquire a response voice signal according to a command voice signal included in a first input voice signal transmitted from a first communication device that participates in an online conference and output a first output voice signal including a command-excluded voice signal obtained by excluding the command voice signal from the first input voice signal; and a communication interface configured to receive the first input voice signal transmitted from the first communication device, transmit the response voice signal to the first communication device, and transmit the first output voice signal to the other communication device that participates in the online conference.

14 Claims, 9 Drawing Sheets

CONFERENCE SERVER AND CONFERENCE SYSTEM

CROSS-REFERENCE TO RELATED APPLICATION

This application is based upon and claims the benefit of priority from Japanese Patent Application No. 2022-016517, filed on Feb. 4, 2022, the entire contents of which are incorporated herein by reference.

FIELD

Embodiments described herein relate generally to a conference server and a conference system.

BACKGROUND

There is known a method for providing a virtual assistant that assists a user who participates in an online conference. Accordingly, the user who participates in the online conference can use a support function of the virtual assistant by a voice command, or a response voice from the virtual assistant can be shared with a user who participates in the online conference.

Meanwhile, the usage of the virtual assistant in the online conference may not be desired to be shared with the other users.

DETAILED DESCRIPTION

One purpose of the embodiment is to provide a conference server that restricts a transmission destination of the response voice signal according to the command voice signal.

In general, according to one embodiment, a conference server includes a processor configured to acquire a response voice signal according to a command voice signal included in a first input voice signal transmitted from a first communication device that participates in an online conference and output a first output voice signal including a command-excluded voice signal obtained by excluding the command voice signal from the first input voice signal; and a communication interface configured to receive the first input voice signal transmitted from the first communication device, transmit the response voice signal to the first communication device, and transmit the first output voice signal to the other communication device that participates in the online conference.

Hereinafter, a conference system according to the embodiment is described with reference to the drawings. In addition, in each figure used for describing the embodiment below, a scale of each part is appropriately changed. Also, in each figure used for describing the embodiment below, configurations are appropriately omitted for the sake of description.

Figure 1:
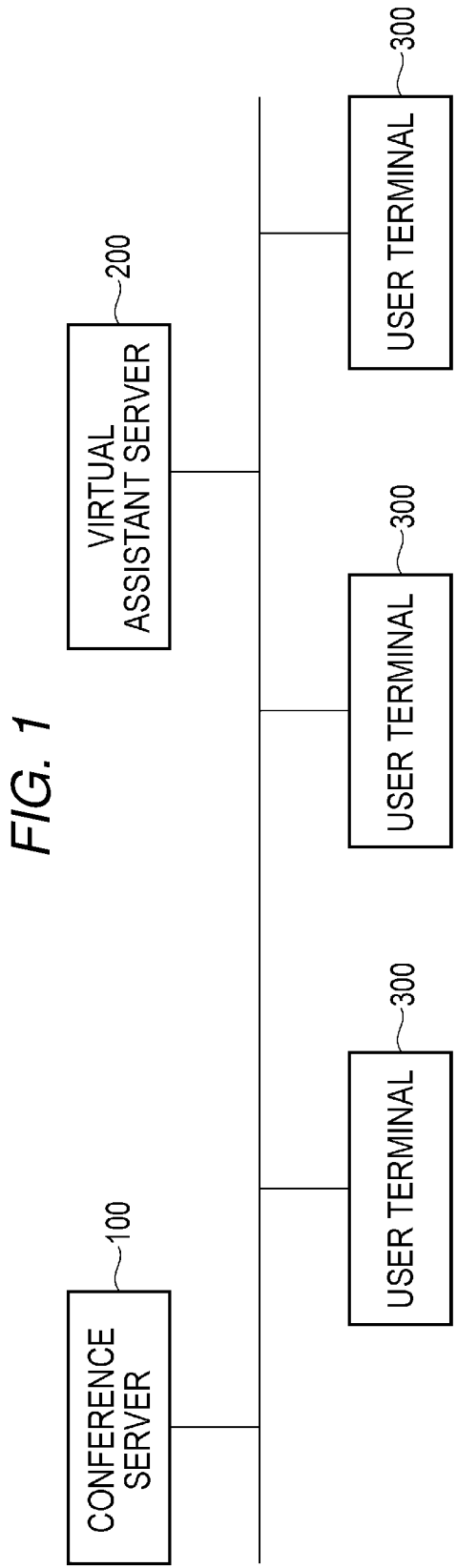
FIG. 1 is a schematic view illustrating an example of a conference system according to an embodiment.

FIG. 1 is a schematic view illustrating an example of a conference system according to the embodiment. The conference system is, for example, a system for performing a conference among users in remote locations via communication, such as an online conference. For example, the conference system includes a conference server 100, a virtual assistant server 200, and user terminals 300 (communication devices). The conference server 100 is communicably connected to the virtual assistant server 200 and the user terminals 300 via the network. In addition, the number of each of the conference servers 100, the virtual assistant servers 200, and the user terminals 300 in FIG. 1 is not limited to the numbers as illustrated.

In addition, in the description of the embodiment, it is assumed that the conference system is used for a video conference, but the conference may be a conference that is held among users through communication such as the Internet such as a telephone conference. In addition, the embodiment is described in an assumption that a certain user participates in an online conference.

Figure 2:
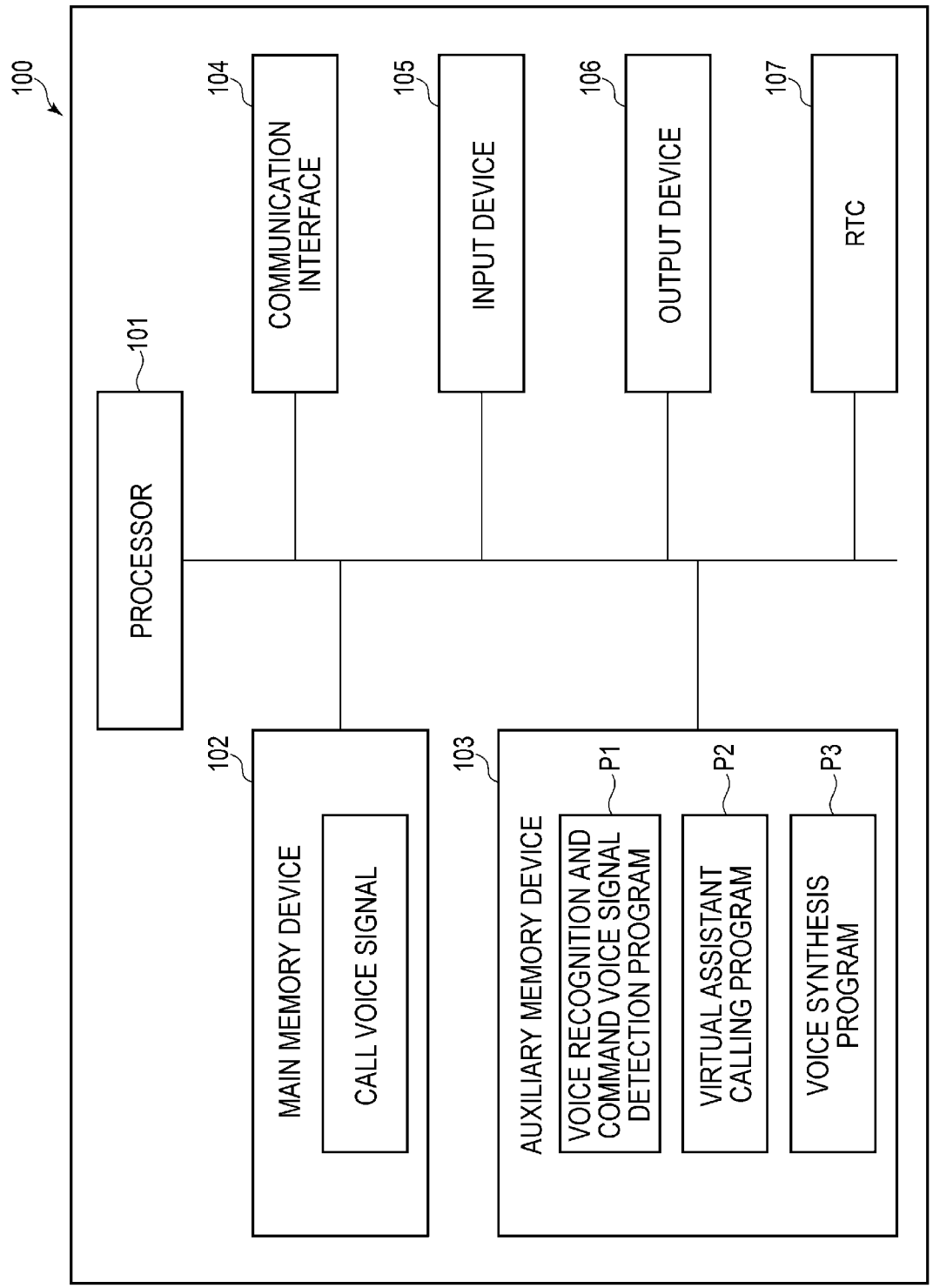
FIG. 2 is a block diagram illustrating an example of a circuit configuration of a conference server.

An example of a circuit configuration of the conference server 100 is described with reference to FIG. 2. FIG. 2 is a block diagram illustrating an example of a circuit configuration of the conference server 100 according to the embodiment.

For example, the conference server 100 includes a processor 101, a main memory device 102, an auxiliary memory device 103, a communication interface 104, an input device 105, an output device 106, and a real-time clock (RTC) 107.

The processor 101 corresponds to the core part of a computer that performs processing such as calculations and control necessary for the operation of the conference server 100. The processor 101 controls each part to embody various functions of the conference server 100 based on a program such as system software, application software, and firmware, a voice recognition and command voice signal detection program P1, a virtual assistant calling program P2, or a voice synthesis program P3 that is stored in the auxiliary memory device 103.

The voice recognition and command voice signal detection program P1 operates, for example, the processor 101 to detect a waveform of an input voice signal received from the user terminal 300 and recognize the waveform as a voice waveform. The voice recognition and command voice signal detection program P1 operates the processor 101 to analyze the recognized voice waveform and detect a command voice signal if a specific voice signal (hereinafter, referred to as a command voice signal) is included in an analysis result.

The virtual assistant calling program P2 operates, for example, the processor 101 to transmit a detection result to the virtual assistant server 200 if a command voice signal is detected and issue an instruction to activate the virtual assistant.

The voice synthesis program P3 operates the processor 101 to perform a process of synthesizing a call voice signal with an input voice signal, a call voice with a command-excluded voice signal, or a call voice signal with a response voice signal. Details of the operation of the processor 101 are described below.

The processor 101 is, for example, a central processing unit (CPU), a micro processing unit (MPU), a system on a chip (SoC), a digital signal processor (DSP), a graphics processing unit (GPU), application specific integrated circuit (ASIC), a programmable logic device (PLD), or a field-programmable gate array (FPGA). Otherwise, the processor 101 is a combination thereof.

The main memory device 102 is, for example, read-only memory (ROM) or a random-access memory (RAM). The ROM is a non-volatile memory that is exclusively used for reading data, and stores data, various setting values, or the like used by the processor 101 for performing various processes. In addition, the RAM is also a memory that is used for reading and writing data, and the processor 101 uses the RAM as a so-called work area for temporarily storing data by performing various processes. It is assumed that the main memory device 102 according to the present embodiment is a RAM exclusively, and is treated as a memory. The main memory device 102 temporarily stores an input voice signal if an input voice signal received from the user terminal 300 if the processor 101 performs the voice recognition process. The main memory device 102 temporarily stores the corresponding command voice signal if the processor 101 detects the command voice signal. The main memory device 102 temporarily stores the call voice signal, the command-excluded voice signal, or the response voice signal on which the processor 101 performs the synthesis process.

The auxiliary memory device 103 is a non-temporary computer-readable storage medium of a computer using the processor 101 as a central part. The auxiliary memory device 103 is, for example, an electric erasable programmable read-only memory (EEPROM) (Registered Trademark), a hard disk drive (HDD), or a solid state drive (SSD). The auxiliary memory device 103 stores data used if the processor 101 performs various processes, data generated by the process by the processor 101, various setting values, and the like. For example, the auxiliary memory device 103 is a memory that stores various kinds of information and stores the voice recognition and command voice signal detection program P1, the virtual assistant calling program P2, the voice synthesis program P3, the call voice signal, the input voice signal, the command voice signal, the command-excluded voice signal, and the response voice signal.

The processor 101 acquires the call voice signal per user terminal, synthesizes the other voice signals with the call voice signal in response to the mode and the signal to generate an output voice signal, and outputs the output voice signal to the auxiliary memory device 103. The mode selected in the present embodiment is one of the sharing mode and the personal mode. The processor 101 controls the generation and output of the voice signal corresponding to the selection of the sharing mode, and, for example, causes the user terminals 300 of all users who participate in the online conference to be in a voice sharing state. The voice sharing state refers to a state in which the virtual assistant is called, and then a voice uttered by the user to the virtual assistant in order to issue a command such as a question or an instruction or a response of the virtual assistant to the command of the user can be heard by all users who participate in the online conference. In addition, the processor 101 controls the generation and the output of the voice signal corresponding to the selection of the personal mode and, for example, causes the user terminal 300 of a predetermined user who participates in the online conference to be in the voice sharing restricted state from the user terminals 300 of the other users. The voice sharing restricted state refers to a state in which the virtual assistant is called, and then a voice uttered in order to issue a command such as a question or an instruction to the virtual assistant and a response of the virtual assistant to the command of the user can be heard by the user who calls the virtual assistant and cannot be heard by the other users.

In addition to the above mode, there may be a mode, for example, in which a group is formed with at least two or more users among all the users who participate in the online conference and the virtual assistant, a certain user in the group calls the virtual assistant, and then a voice uttered by the user to the virtual assistant in order to issue a command such as a question or an instruction and a response of the virtual assistant to the command of the user can be heard by the group.

In addition, instead of the auxiliary memory device 103 or in addition to the auxiliary memory device 103, the conference server 100 may include an interface into which a storage medium such as a removable optical disc, a memory card, a universal serial bus (USB) memory can be inserted.

The program stored in the auxiliary memory device 103 includes a program for performing processes described below. For example, the conference server 100 is transferred to an administrator of the conference server 100 or the like in a state in which the corresponding program is stored in the auxiliary memory device 103. However, the conference server 100 may be transferred to the corresponding administrator or the like in a state in which the corresponding program is not stored in the auxiliary memory device 103. Also, the program for performing the processes described below may be separately transferred to the corresponding administrator or the like, and may be written to the auxiliary memory device 103 under the operation by the corresponding administrator or the like. The transfer of the program at this time can be embodied by storing the program on a removable storage medium such as a magnetic disk, a magneto-optical disk, an optical disk, or a semiconductor memory, or by downloading the program via a network or the like.

The communication interface 104 is an interface for communication with the virtual assistant server 200, the user terminals 300, and the like via the network or the like. For example, the communication interface 104 receives the input voice signal transmitted from the user terminal 300. In addition, the communication interface 104 receives the response voice signal transmitted from the virtual assistant server 200.

The input device 105 is, for example, a device that receives voice data of a microphone or the like or a device that recognizes character data input by an administrator who manages the conference server 100 from an input detection sheet that employs an electrostatic method or a pressure method.

The output device 106 is, for example, a display device using liquid crystal, organic EL, or the like and displays voices, characters, images, and the like according to the signal input from the input device 105.

The RTC 107 is a clock or a circuit in which a clock function is built.

Figure 3:
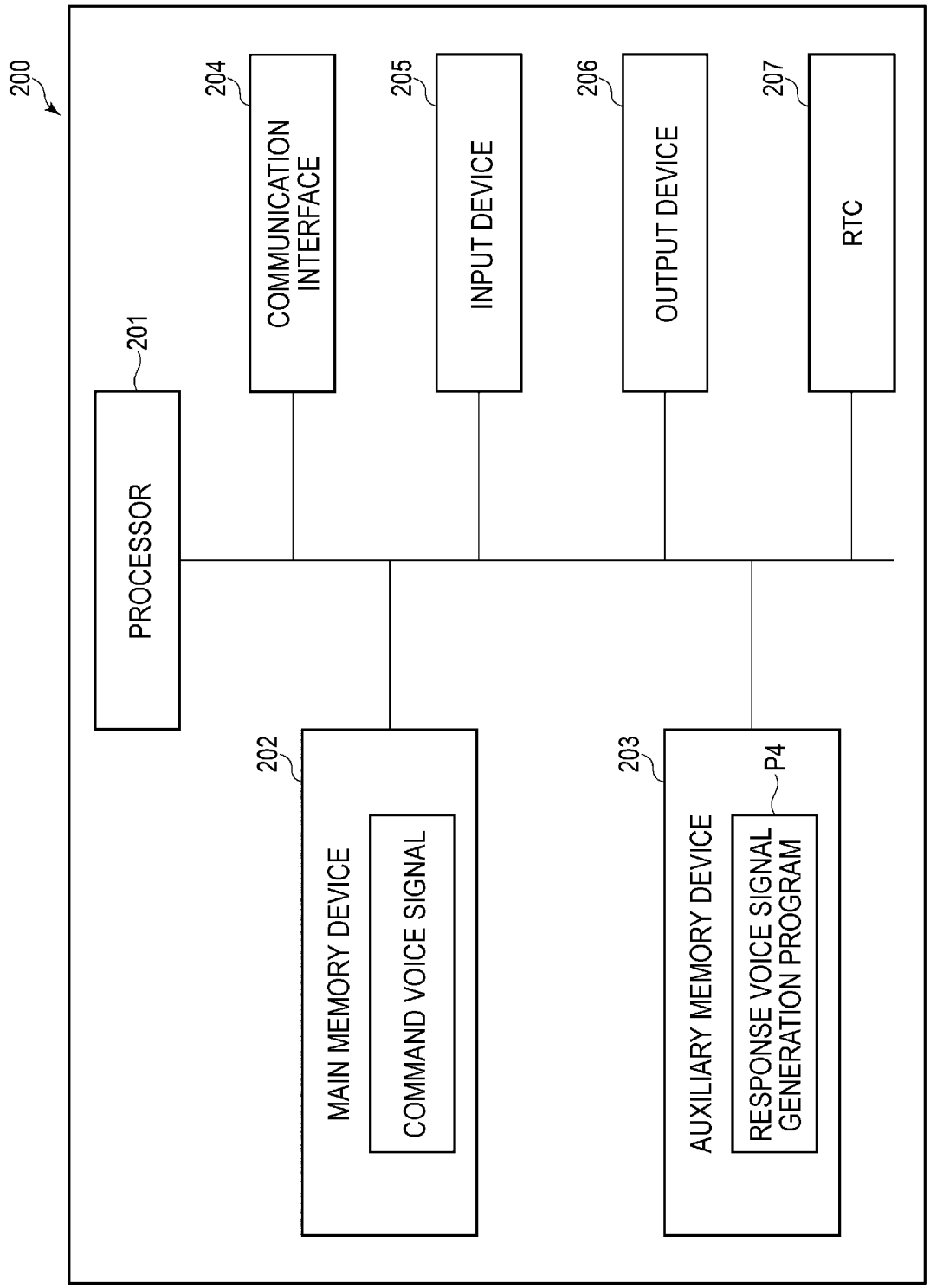
FIG. 3 is a block diagram illustrating an example of a circuit configuration of a virtual assistant server.

An example of the circuit configuration of the virtual assistant server 200 is described by using FIG. 3. FIG. 3 is a block diagram illustrating an example of the circuit configuration of the virtual assistant server 200 according to the embodiment.

For example, the virtual assistant server 200 includes a processor 201, a main memory device 202, an auxiliary memory device 203, a communication interface 204, an input device 205, an output device 206, and a real-time clock (RTC) 207.

The processor 201 corresponds to the core part of a computer that performs processing such as calculations and control necessary for the operation of the virtual assistant server 200. The processor 201 controls each part to embody various functions of the virtual assistant server 200 based on a program such as system software, application software, and firmware, or a response voice signal generation program P4 that is stored in the auxiliary memory device 203.

The response voice signal generation program P4 operates, for example, the processor 201 to generate a response voice corresponding to the command voice transmitted from the communication interface 104.

The processor 201 is, for example, a central processing unit (CPU), a micro processing unit (MPU), a system on a chip (SoC), a digital signal processor (DSP), a graphics processing unit (GPU), application specific integrated circuit (ASIC), a programmable logic device (PLD), or a field-programmable gate array (FPGA). Otherwise, the processor 201 is a combination thereof.

The main memory device 202 is, for example, read-only memory (ROM) or a random-access memory (RAM). The ROM is a non-volatile memory that is exclusively used for reading data, and stores data, various setting values, or the like used by the processor 201 for performing various processes. In addition, the RAM is also a memory that is used for reading and writing data, and the processor 201 uses the RAM as a so-called work area for temporarily storing data by performing various processes. It is assumed that the main memory device 202 according to the present embodiment is a RAM exclusively, and is treated as a memory. The main memory device 202 temporarily stores the command voice signal received from the conference server 100 and temporarily stores the response voice signal generated in response to the command voice signal by the processor 201.

The auxiliary memory device 203 is a non-temporary computer-readable storage medium of a computer using the processor 201 as a central part. The auxiliary memory device 203 is, for example, an electric erasable programmable read-only memory (EEPROM) (Registered Trademark), a hard disk drive (HDD), or a solid state drive (SSD). The auxiliary memory device 203 stores data used if the processor 201 performs various processes, data generated by the process by the processor 201, various setting values, and the like. For example, the auxiliary memory device 203 stores the response voice signal generation program P4, the command voice signal, and the response voice signal.

The processor 201 outputs the response voice signal according to the command voice signal received from the conference server 100 to the auxiliary memory device 203, and the auxiliary memory device 203 stores the corresponding command voice signal and the corresponding response voice signal. An example of a method in which the virtual assistant server 200 generates the response voice signal according to the command voice signal will be described. The processor 201 converts voice waveform data of the command voice signal transmitted from the conference server into text data, for example, by using data stored in the virtual assistant server 200 as an acoustic model. Next, the processor 201 converts the text data into statistically most appropriate character strings by using the data stored in the virtual assistant server 200 as a language model. The processor 201 analyzes the syntax from the part of speech of the corresponding character strings, analyzes the intention of the user by using a neural network or machine learning, and generates a response voice signal according to the command voice signal. As the method of generating a response voice signal from the command voice signal of the virtual assistant server 200, various methods are generally known, and the method is not limited to the method described above. A virtual assistant is an AI engine that provides a support function in response to the call command from the user. Statistical dialogue techniques using rule-based dialogue technology and deep learning technology are used to configure the virtual assistant.

The program stored in the auxiliary memory device 203 includes a program for performing processes described below. For example, the virtual assistant server 200 is transferred to an administrator of the virtual assistant server 200 or the like in a state in which the corresponding program is stored in the auxiliary memory device 203. However, the virtual assistant server 200 may be transferred to the corresponding administrator in a state in which the corresponding program is not stored in the auxiliary memory device 203. Also, the program for performing the processes described below may be separately transferred to the corresponding administrator or the like and may be written to the auxiliary memory device 203 under the operation by the corresponding administrator or the like. The transfer of the program at this time can be embodied by storing the program on a removable storage medium such as a magnetic disk, a magneto-optical disk, an optical disk, or a semiconductor memory, or by downloading the program via a network or the like.

The communication interface 204 is an interface for communication of the virtual assistant server 200 with the conference server 100, the user terminals 300, and the like via the network or the like. For example, the communication interface 204 receives the command voice signal transmitted from the conference server 100. In addition, the communication interface 204 transmits the response voice signal generated in response to the command voice signal to the conference server 100.

In addition, the configurations of the input device 205, the output device 206, and the RTC 207 that are circuit configurations of the virtual assistant server 200 according to the embodiment are the same as the circuit configurations of the conference server 100 according to the embodiment, and thus the descriptions thereof are omitted.

Figure 4:
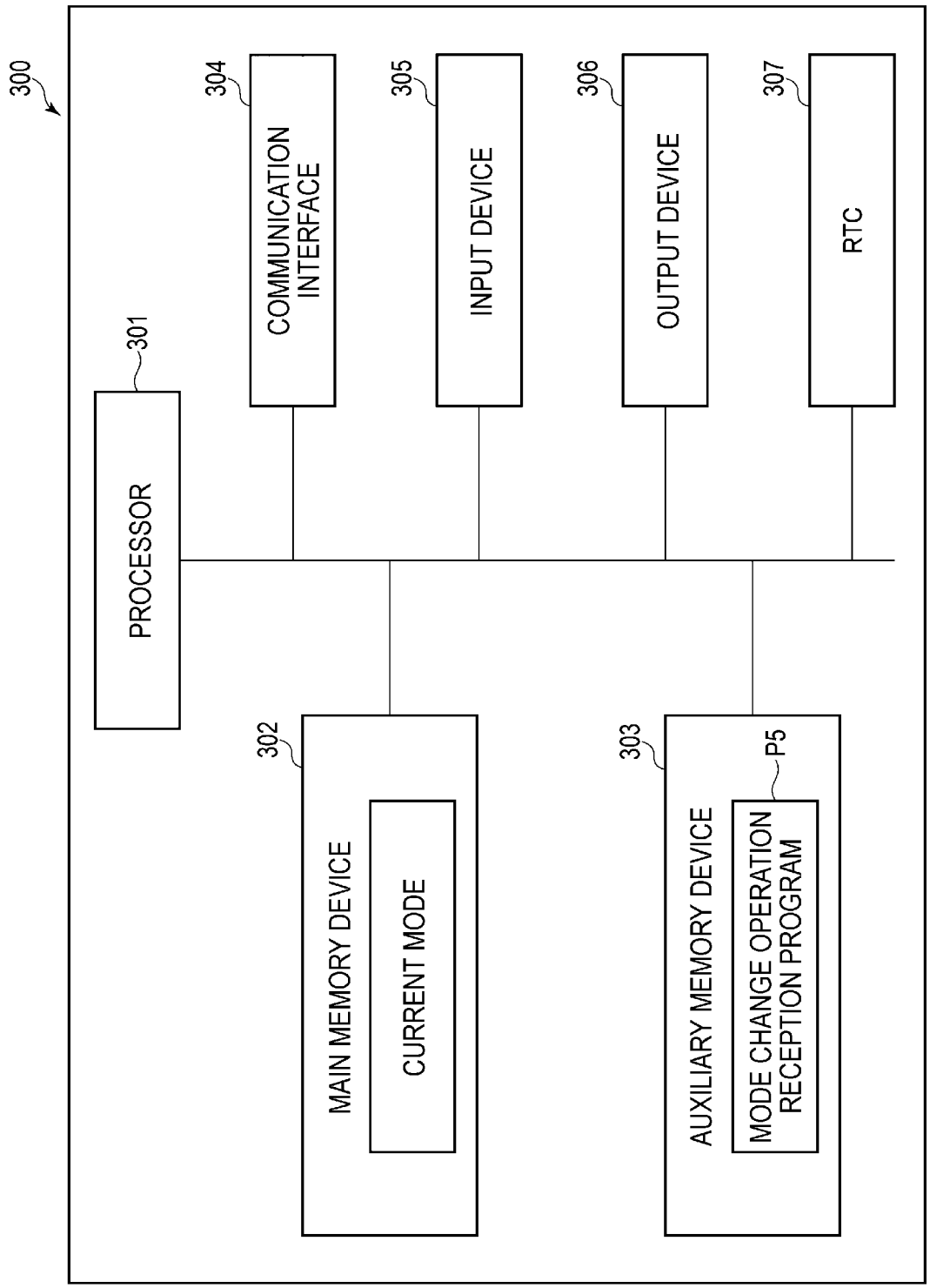
FIG. 4 is a block diagram illustrating an example of a circuit configuration of a user terminal.

An example of the circuit configuration of the user terminal 300 is described by using FIG. 4. FIG. 4 is a block diagram illustrating an example of the circuit configuration of the user terminal 300 according to the embodiment.

The user terminal 300 is an electronic device such as a computer, and examples thereof include a television receiver (including an Internet television), a personal computer (PC), a mobile terminal (for example, a tablet, a smartphone, a laptop, a feature phone, a portable game machine, a digital music player, and an electronic book reader), a virtual reality (VR) terminal, and an augmented reality (AR) terminal. However, the embodiment is not limited thereto.

For example, the user terminal 300 includes a processor 301, a main memory device 302, an auxiliary memory device 303, a communication interface 304, an input device 305, an output device 306, and a real time clock (RTC) 307.

The processor 301 corresponds to the core part of a computer that performs processing such as calculations and control necessary for the operation of the user terminal 300. The processor 301 controls each part to embody various functions of the user terminal 300 based on a program such as system software, application software, and firmware, or a mode change operation reception program P5 that is stored in the auxiliary memory device 303.

The processor 301 is, for example, a central processing unit (CPU), a micro processing unit (MPU), a system on a chip (SoC), a digital signal processor (DSP), a graphics processing unit (GPU), application specific integrated circuit (ASIC), a programmable logic device (PLD), or a field-programmable gate array (FPGA). Otherwise, the processor 301 is a combination thereof.

The mode change operation reception program P5 causes the processor 301 to change the current mode, for example, if pressing of a button of switching the personal mode and the sharing mode displayed on the screen of the user terminal 300 is detected.

The main memory device 302 is, for example, read-only memory (ROM) or a random-access memory (RAM). The ROM is a non-volatile memory that is exclusively used for reading data, and stores data, various setting values, or the like used by the processor 301 for performing various processes. In addition, the RAM is also a memory that is used for reading and writing data, and the processor 301 uses the RAM as a so-called work area for temporarily storing data by performing various processes. It is assumed that the main memory device 302 according to the present embodiment is a RAM exclusively, and is treated as a memory. The main memory device 302 temporarily stores the input voice signal, that is the voice of the user who uses the user terminal 300. In addition, the main memory device 302 temporarily stores the current mode that is selected by the user and temporarily stores the call voice signal transmitted from the conference server 100 by the synthesis process in response to the mode.

The auxiliary memory device 303 is a non-temporary computer-readable storage medium of a computer using the processor 301 as a central part. The auxiliary memory device 303 is, for example, an electric erasable programmable read-only memory (EEPROM) (Registered Trademark), a hard disk drive (HDD), or a solid state drive (SSD). The auxiliary memory device 303 stores data used if the processor 301 performs various processes, data generated by the process by the processor 301, various setting values, and the like. For example, the auxiliary memory device 303 stores the mode change operation reception program P5, the input voice signal, and the call voice signal.

The processor 301 acquires the voice uttered by the user by the input device 305, outputs the acquired voice to the auxiliary memory device 303, and causes the auxiliary memory device 303 to store the acquired voice as the input voice signal. In addition, the processor 301 outputs the call voice signal synthesized in response to the mode transmitted by the conference server 100 and stores the call voice signal in the auxiliary memory device 303.

The program stored in the auxiliary memory device 303 includes a program for performing processes described below. For example, the user terminal 300 is transferred to an administrator of the user terminal 300 or the like in a state in which the corresponding program is stored in the auxiliary memory device 303. However, the user terminal 300 may be transferred to the corresponding administrator or the like in a state in which the corresponding program is not stored in the auxiliary memory device 303. Also, the program for performing the processes described below may be separately transferred to the corresponding administrator or the like and may be written to the auxiliary memory device 303 under the operation by the corresponding administrator or the like. The transfer of the program at this time can be embodied by storing the program on a removable storage medium such as a magnetic disk, a magneto-optical disk, an optical disk, or a semiconductor memory, or by downloading the program via a network or the like.

The communication interface 304 is an interface for communication of the user terminal 300 with the conference server 100, the virtual assistant server 200, and the like via the network or the like. For example, the communication interface 304 transmits the voice signal input to the input device 305 to the conference server 100 as the input voice signal. In addition, the communication interface 304 receives the call voice signal synthesized in response to the current mode of the user terminal 300 by the conference server 100.

In addition, the configurations of the input device 305, the output device 306, and the RTC 307 that are circuit configurations of the user terminal 300 according to the embodiment are the same as the circuit configurations of the conference server 100 according to the embodiment, and thus the descriptions thereof are omitted.

Figure 5:
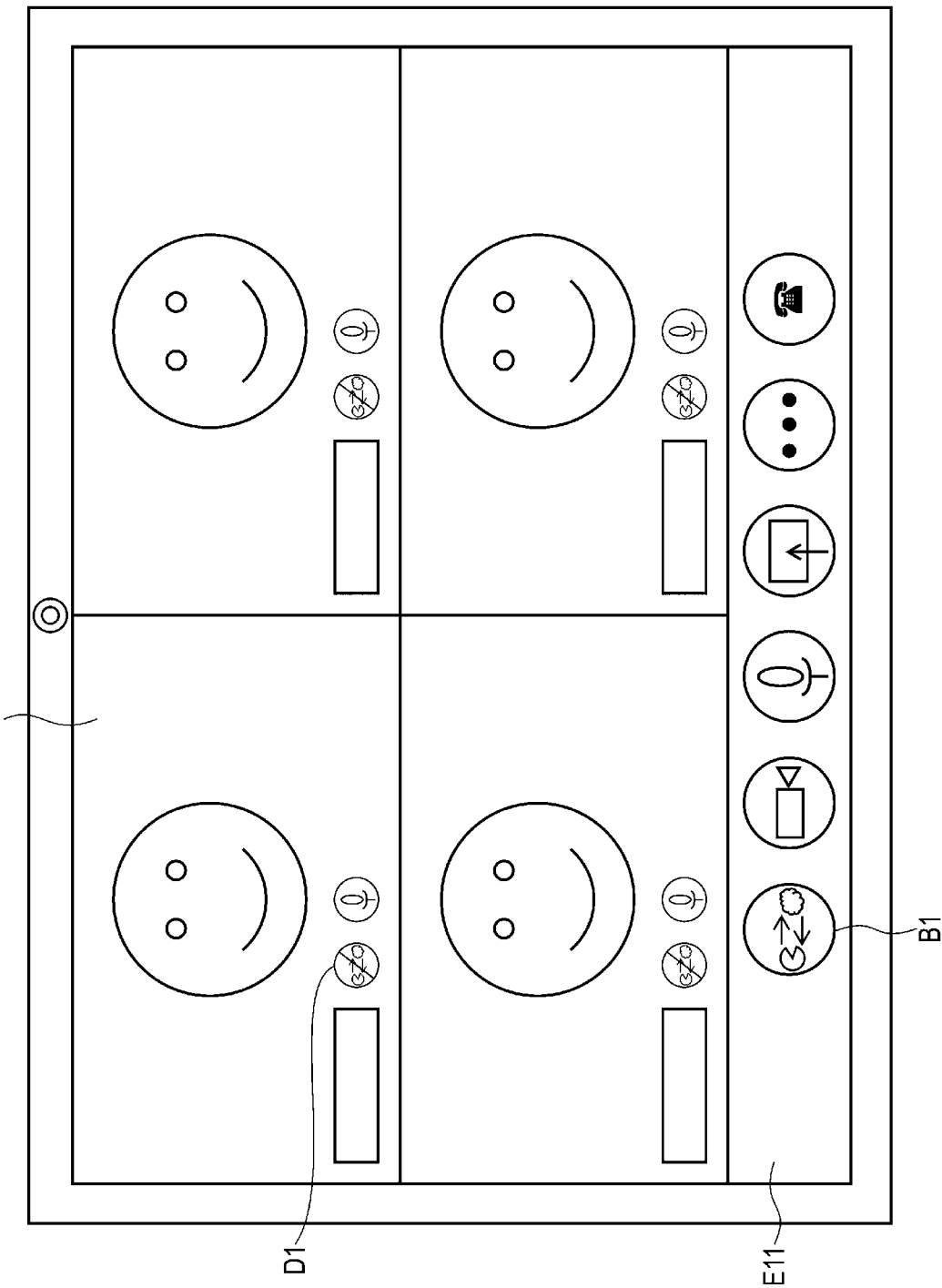
FIG. 5 is a schematic view illustrating an example of a first screen displayed by a user terminal that selects a personal mode.
Figure 6:
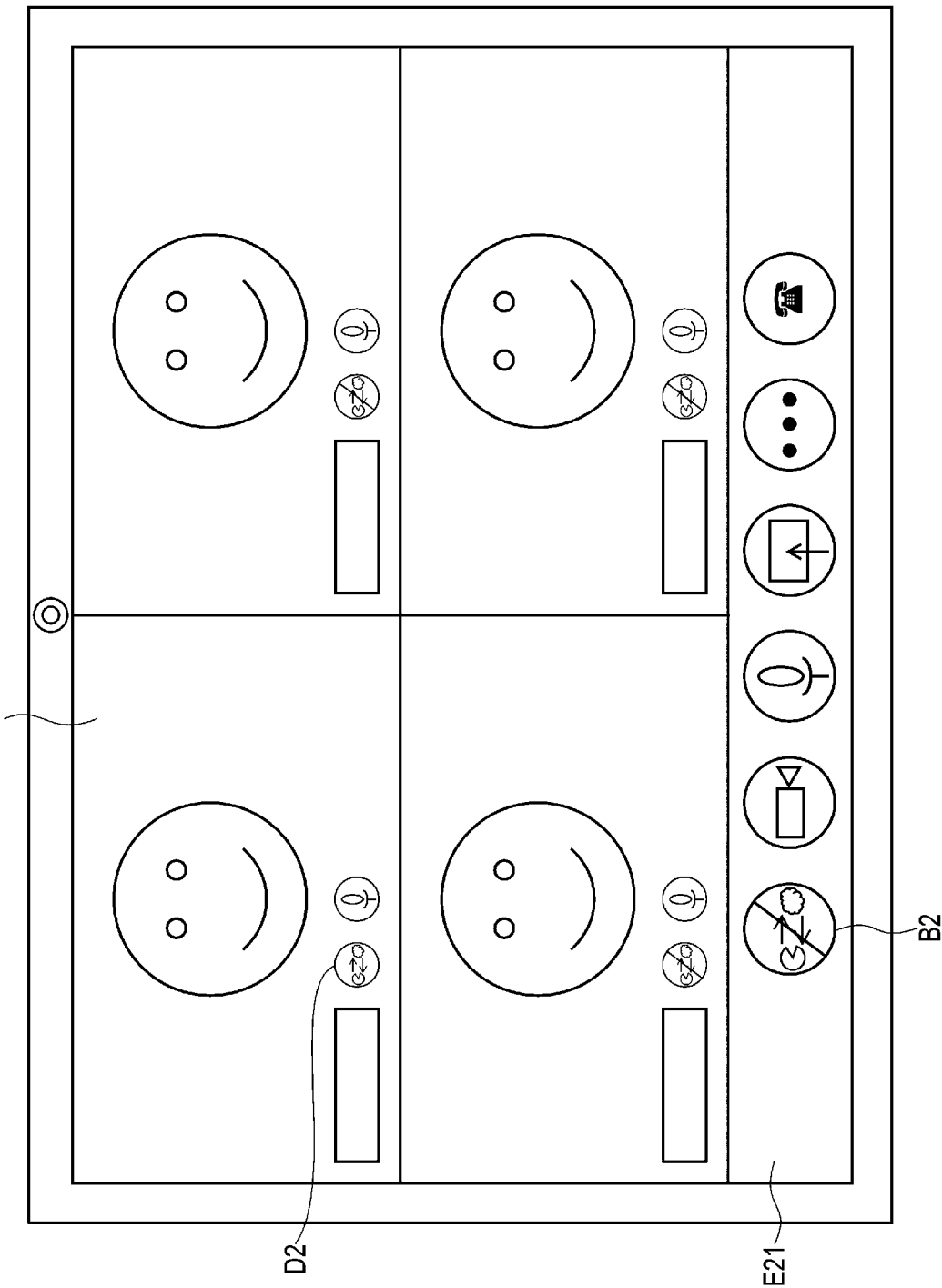
FIG. 6 is a schematic view illustrating an example of a second screen displayed by a user terminal that selects a sharing mode.

The screen displays if the personal mode is used in the user terminal 300, and if the other users use the personal mode are described with reference to FIGS. 5 and 6. The output device 306 of the user terminal 300 who participates in the online conference via the network displays the screen of the online conference or the like. FIG. 5 is a schematic view illustrating an example of the first screen displayed by the user terminal 300 that selects the personal mode. FIG. 6 is a schematic view illustrating an example of the second screen displayed by the user terminal 300 that selects the sharing mode.

The first screen illustrated in FIG. 5 includes an area E11 and an area E12. For example, the area E11 includes a plurality of buttons. The button of the area E11 receives the change of settings to the user terminal 300 that participates in the predetermined online conference and displays the first screen. In addition, the button of the area E11 shows the status of the received setting. The area E12 includes a status display and a user display. The status display of the area E12 displays the statuses of the other user terminals 300 that participate in the predetermined online conference. The user display of the area E12 displays the images provided from the other user terminals 300 that participate in the predetermined online conference.

For example, a button B1 included in the first screen receives the switch of the personal mode or the sharing mode. The button B1 without a slash symbol shows that the personal mode is selected in the user terminal 300 that displays the first screen. In the state in which the first screen is displayed, the output voice signals output from the other user terminals 300 to be the partners of the conference displayed on the first screen (for example, partners of the conference displayed in a 4-split screen) become signals obtained by excluding at least a part of the command voice signals and the response voice signals. The command voice signal includes a call voice signal for calling the virtual assistant and a command execution voice signal for causing the virtual assistant to execute various commands and output a response voice signal, and the output voice signals that are output from the other user terminals 300 to be the partners of the conference become signals obtained by excluding the command execution voice signal.

A mode display D1 included in the first screen shows the personal mode or the sharing mode in the other user terminals 300 to be the partners of the conference. The mode display D1 with a slash symbol shows that the sharing mode is selected in the other user terminal 300 to be the partner of the conference. In the state in which the first screen is displayed, the other user terminals 300 to be the partners of the conference are in the sharing mode, the user terminal 300 that displays the first screen is in the personal mode, and thus the user terminal 300 that displays the first screen outputs the voices from the other user terminals 300 to be the partners of the conference. Accordingly, the user of the user terminal 300 that displays the first screen can hear the voices from the other user terminals 300 to be the partners of the conference. In addition, the other user terminals 300 displayed on the first screen output voices obtained by excluding the command execution voice signal and the response voice signal from voices from the user terminal 300 that displays the first screen. Accordingly, the users of the other user terminals 300 can hear the voices obtained by excluding the command execution voice signal and the response voice signal from the voices from the user terminal 300 that displays the first screen.

The second screen illustrated in FIG. 6 includes an area E21 and an area E22. For example, the area E21 includes a plurality of buttons. The buttons of the area E21 receive changes of settings to the user terminal 300 that participates in the predetermined online conference and displays the second screen. In addition, the buttons of the area E21 show statuses of received settings. The area E22 includes a status display and a user display. The status displays of the area E22 display the statuses of the other user terminals 300 that participate in the predetermined online conference. The user display of the area E22 displays the images provided from the other user terminals 300 that participate in the predetermined online conference.

For example, a button B2 included in the second screen receives the switch of the personal mode or the sharing mode. The button B2 with a slash symbol shows that the sharing mode is selected in the user terminal 300 that displays the second screen. In the state in which the second screen is displayed, the output voice signals output from the other user terminals 300 to be the partners of the conference which are displayed on the second screen (for example, the partners of the conference displayed in the 4-split screen) become all voices including the command voice signal and the response voice signal.

A mode display D2 included in the second screen shows the personal mode or the sharing mode in the other user terminals 300 to be the partners of the conference. The mode display D2 without a slash symbol shows that the personal mode is selected in the other user terminal 300 to be the partner of the conference. In the state in which the second screen is displayed, the user terminal 300 that displays the second screen outputs the voices obtained by excluding the command execution voice signals and the response voice signals from the voices of the other user terminals 300 corresponding to the mode displays D2 without slash symbols. In addition, the user terminal 300 that displays the second screen outputs all voices from the other user terminals 300 corresponding to the buttons without slash symbols. Accordingly, the user of the user terminal 300 that displays the second screen can hear the voices obtained by excluding the command execution voice signals and the response voice signals from the voices from the other user terminals 300 corresponding to the mode displays D2 without slash symbols, and can hear all the voices from the other user terminals 300 corresponding to buttons without slash symbols.

Figure 7:
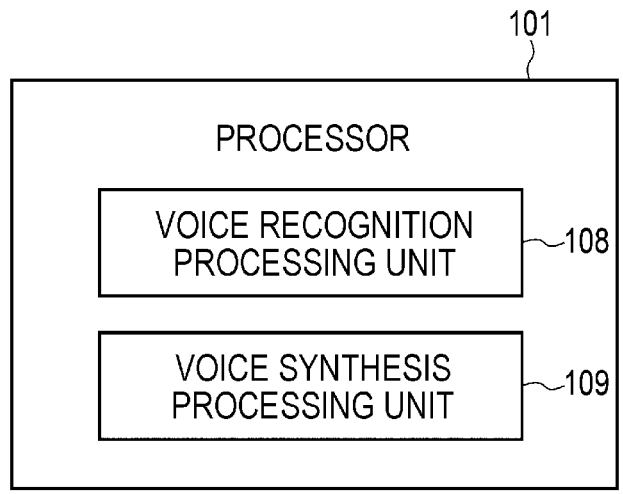
FIG. 7 is a block diagram illustrating an example of a configuration of a processor of the conference server.

An example of the configuration of the processor 101 of the conference server 100 is described with reference to FIG. 7. FIG. 7 is a block diagram illustrating an example of the configuration of the processor 101 of the conference server 100 according to the embodiment.

The processor 101 includes a voice recognition processing unit 108 and a voice synthesis processing unit 109. The processor 101 executes the voice recognition and command voice signal detection program P1, the virtual assistant calling program P2, and the voice synthesis program P3 written to the auxiliary memory device 103 to embody functions of the units of the voice recognition processing unit 108 and the voice synthesis processing unit 109. In addition, the voice recognition processing unit 108 and the voice synthesis processing unit 109 may be embodied by hardware such as a large scale integration (LSI), an application specific integrated circuit (ASIC), and a field-programmable gate array (FPGA) which has the same function as the processor 101 executing the programs.

The voice recognition processing unit 108 performs the voice recognition process at any timing during the online conference. For example, the voice recognition processing unit 108 acquires the call voice signal stored in the auxiliary memory device 103, initializes the corresponding call voice signal, detects the input voice signals from the other user terminals 300, performs the voice recognition process, and calls the virtual assistant if the command voice signal is detected.

In addition, the voice synthesis processing unit 109 performs the voice synthesis process. After the voice recognition process is performed, for example, if the input terminal of the command voice signal is in the personal mode, the voice synthesis processing unit 109 performs the process of synthesizing the command-excluded voice signal and the call voice signal, and performs the process of synthesizing the response voice signal and the call voice signal according to the command voice signal. If the input terminal of the command voice signal is in the sharing mode, the voice synthesis processing unit 109 performs the process of synthesizing the input voice signal and the call voice signal in response to whether the input terminal is a terminal that inputs the input voice signal and performs the process of synthesizing the response voice signal according to the command voice signal. The voice synthesis processing unit 109 stores the call voice signal in the auxiliary memory device 103 and instructs the user terminal 300 to transmit the call voice signal.

Figure 8:
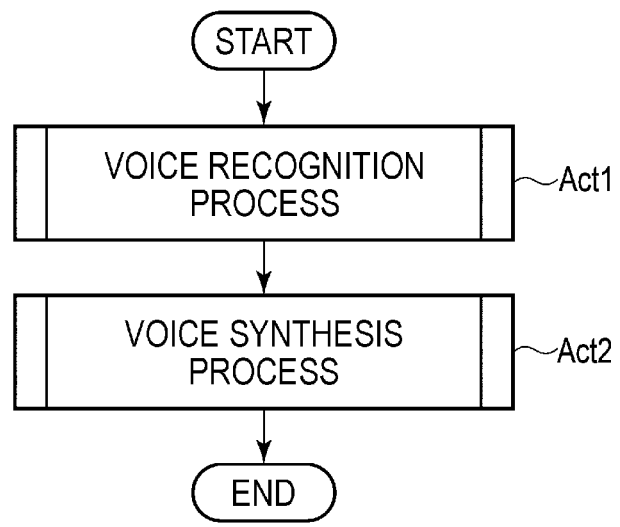
FIG. 8 is a flowchart illustrating an example of an overall operation by the conference server.

Hereinafter, the operations of the conference server 100 according to the embodiment are described with reference to FIGS. 8, 9, and 10. In addition, the contents of the processes in the following operation description are examples, and various processes by which the same effect can be obtained can be appropriately used. FIG. 8 is a flowchart illustrating an example of the overall operation of the conference server 100 according to the embodiment. The processor 101 performs the processes based on the programs stored in the auxiliary memory device 103 or the like. In addition, unless particularly described otherwise, the processes of the processor 101 are transitions to Act (N+1) after Act N (N is a natural number).

For example, the processor 301 of the first user terminal 300 instructs the online conference setting request based on the online conference setting request received via the input device 305. The communication interface 304 transmits the online conference setting request to the conference server 100. The communication interface 104 of the conference server 100 receives the online conference setting request. The processor 101 generates online conference participation information and invitation information based on the online conference setting request. The communication interface 104 transmits the participation information and invitation information to the first user terminal 300. The communication interface 304 of the first user terminal 300 receives the participation information and the invitation information, and the auxiliary memory device 303 stores the participation information and the invitation information. The participation information and the invitation information include online conference access information on the WEB.

The first user terminal 300 requests to participate in the online conference based on the participation information, the conference server 100 permits the online conference participation of the first user terminal 300 based on the participation information, and the first user terminal 300 participates in the online conference via the communication network.

In addition, the first user terminal 300 transmits the invitation information to the second user terminal 300. The second user terminal 300 requests the online conference participation based on the invitation information, and the conference server 100 inquires of the first user terminal 300 about the online conference participation of the second user terminal 300 based on the invitation information. If the participation approval of the first user terminal 300 is received, the conference server 100 permits the participation of the online conference of the second user terminal 300 based on the invitation information, and the second user terminal 300 participates in the online conference via the communication network. As described above, the online conference is held by communication connection between the conference server 100, the first user terminal 300 (first communication device), and the second user terminal 300 (second communication device).

The conference server 100 performs the processes shown in FIG. 8 at any timing during the online conference. In Act 1, the processor 101 (the voice recognition processing unit 108), for example, acquires the call voice signal stored in the auxiliary memory device 103, and initializes the corresponding call voice signal. The voice recognition processing unit 108 detects the input voice signal received from the user terminal 300. The voice recognition processing unit 108 performs the voice recognition process with respect to the input voice signal. If the command voice signal is detected after the voice recognition process, the voice recognition processing unit 108 calls the virtual assistant. Details of the voice recognition process are described below.

In Act 2, after the voice recognition process, for example, if the input terminal of the command voice signal is in the personal mode, the processor 101 (the voice synthesis processing unit 109) performs the process of synthesizing the command-excluded voice signal and the call voice signal. The voice synthesis processing unit 109 performs the process of synthesizing the response voice signal and the call voice signal with the call voice signal for the terminal to which the command voice signal is input, according to the command voice signal. Meanwhile, the voice synthesis processing unit 109 performs the process of synthesizing the command-excluded voice signal and the call voice signal with the call voice signal for the other terminals except for the terminal to which the command voice signal is input. If the input terminal of the command voice signal is in the sharing mode, the voice synthesis processing unit 109 performs the process of synthesizing the input voice signal and the call voice signal in response to whether the input terminal is the terminal to which the input voice signal is input. Thereafter, the voice synthesis processing unit 109 performs the process of synthesizing the response voice signal according to the command voice signal. The voice synthesis processing unit 109 stores the call voice signal in the auxiliary memory device 103 for each of the user terminals 300. The voice synthesis processing unit 109 acquires the call voice signal for the user terminals 300 from the auxiliary memory device 103 and instructs the transmission of the call voice signal to the user terminals 300. Details of the voice synthesis process are described below.

Figure 9:
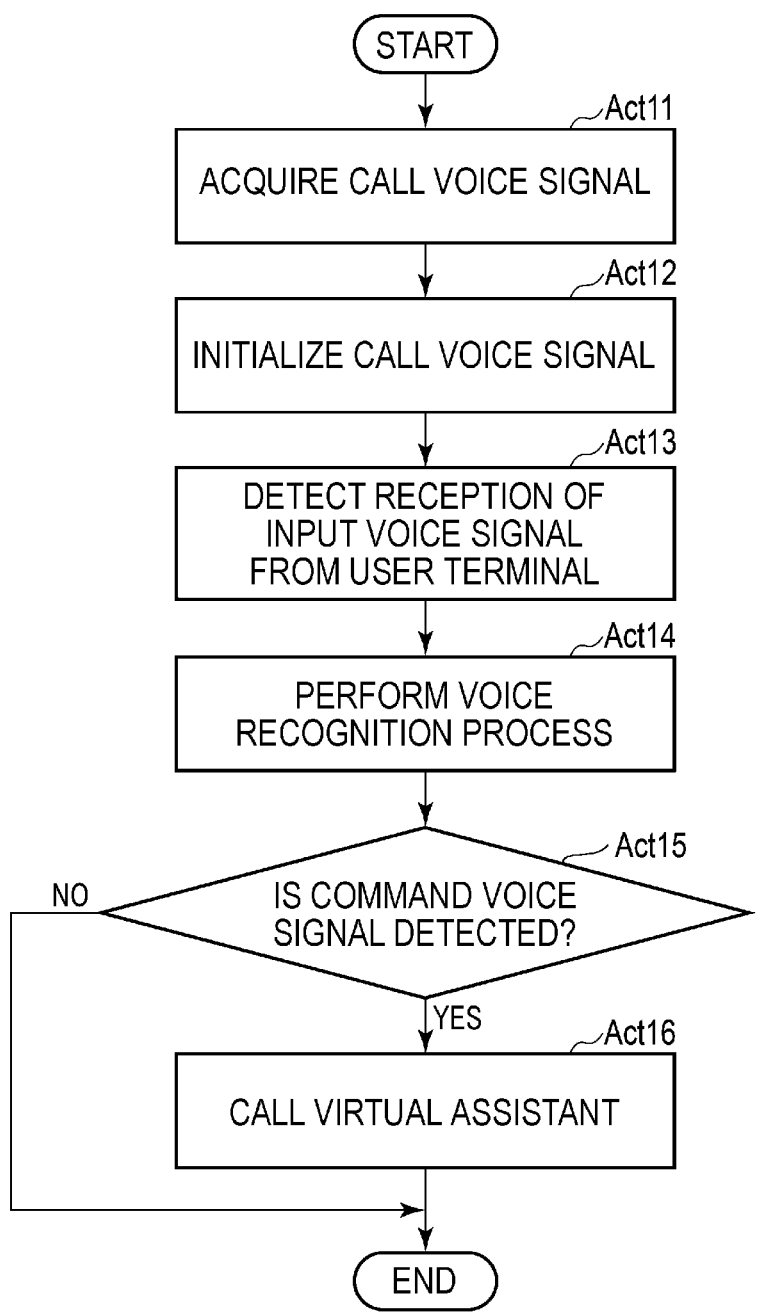
FIG. 9 is a flowchart illustrating an example of a voice recognition processing operation by the conference server.

FIG. 9 is a flowchart showing an example of the voice recognition processing operation by the conference server 100 according to the embodiment. That is, FIG. 9 is a flowchart for specifically describing the voice recognition process of Act 1 shown in FIG. 8.

The conference server 100 starts the process shown in FIG. 9. At any timing, for example, if the start of the online conference is detected, the processor 101 starts the process. The processor 101 stores the call voice signal stored in the auxiliary memory device 103, in the main memory device 102, and acquires the call voice signal (Act 11). The processor 101 initializes the call voice signal stored in the main memory device 102 (Act 12). The processor 101 may be initialized at any timing, and for example, can be initialized after transmitting the call voice signal to the user terminals 300. The processor 101 waits for the reception of the input voice signal from the user terminal 300 and transitions to the next process if the reception of the input voice signal (first input voice signal) transmitted from the communication interface 304 of the user terminal 300 (first communication device) is detected (Act 13). After the process of Act 13 is performed, the processor 101 performs the voice recognition process to the input voice signal. The voice recognition process of the processor 101 performs the process of comparing, for example, the waveform of the input voice signal with the waveform of language data stored in the auxiliary memory device 103 or language data searched in the state of being connected to the Internet to convert the input voice signal to the language and converting the corresponding language to the appropriate character string and the like. As the voice recognition process, there are other various methods. The method is not limited to the above method, and the process may be performed in the other well-known methods.

After the voice recognition process is performed in Act 14, the processor 101 detects the specific command voice signal included in the text data or the waveform data obtained from the result of the voice recognition process (Act 15). If the command voice signal is detected (YES in Act 15), the processor 101 calls the virtual assistant from the virtual assistant server 200 based on the call voice signal included in the command voice signal. The call voice signal is for calling the virtual assistant, and examples thereof include the name of the virtual assistant or the combination of the interjection and the name of the virtual assistant. For example, if the command voice signal is detected, the processor 101 transmits the virtual assistant request to the virtual assistant server 200 via the communication interface 104. The processor 201 receives the virtual assistant request via the communication interface 104 and activates the virtual assistant corresponding to the response voice signal generation program P4.

In addition, the virtual assistant may be called not by the virtual assistant server 200 but by the conference server 100.

That is, the calling method described above can be embodied by installing the function of the virtual assistant server 200 in the conference server 100.

Figure 10:
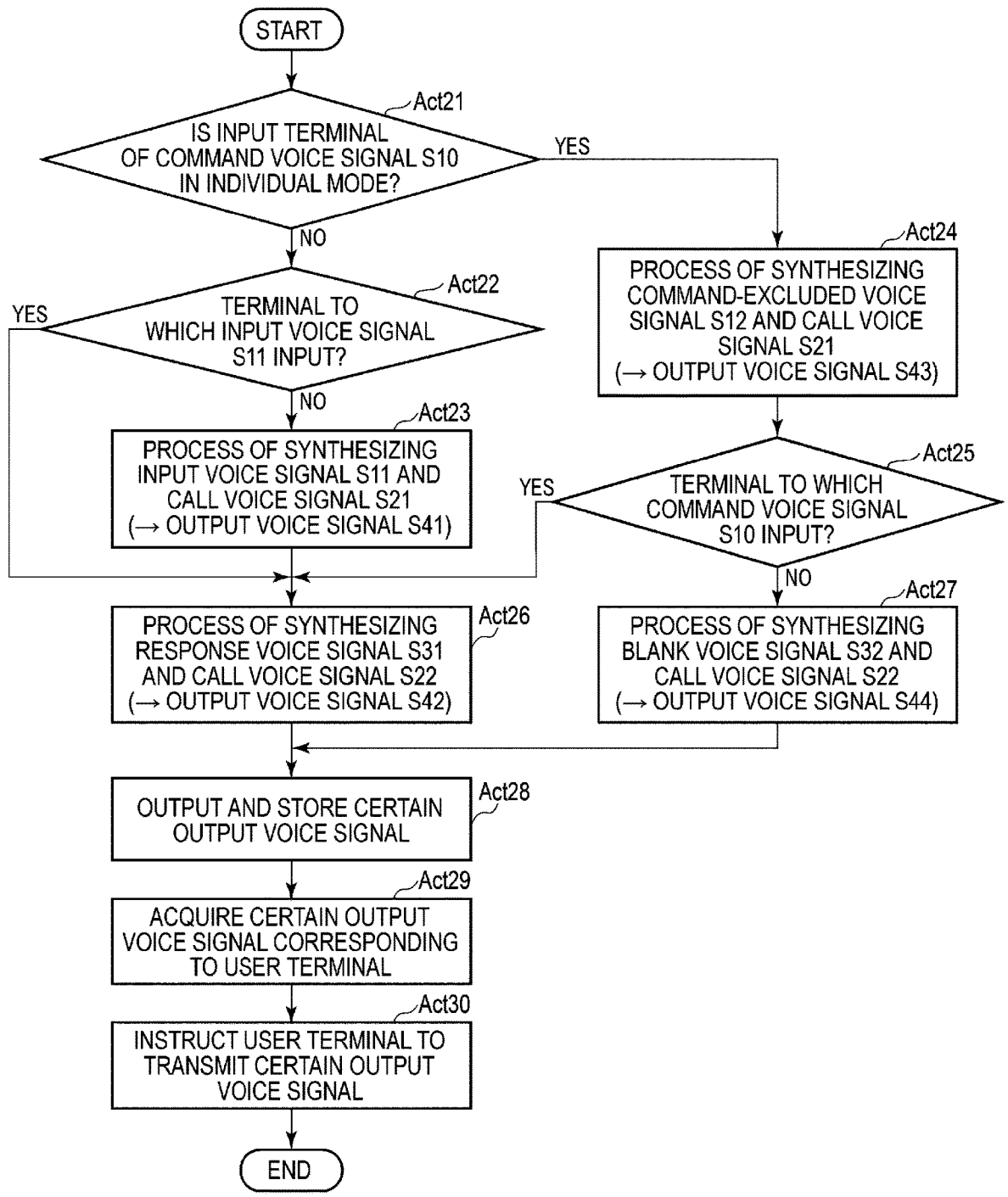
FIG. 10 is a flowchart illustrating an example of a voice synthesis processing operation by the conference server.

FIG. 10 is a flowchart showing an example of the voice synthesis processing operation by the conference server 100 according to the embodiment. That is, FIG. 10 is a flowchart for describing details of the voice synthesis process of Act 2 shown in FIG. 8.

The communication interface 104 receives the current mode stored in the main memory device 302 of the user terminal 300 to which a command voice signal S10 is input. The auxiliary memory device 103 (memory) stores the received current mode. The processor 101 acquires the current mode stored in the auxiliary memory device 103 (Act 21). In addition, the processor 101 may acquire the current mode of the user terminal 300 whenever the mode of the user terminal 300 is changed, or the processor 101 may selectively acquire the current mode.

The processor 101 acquires the current mode, that is, the personal mode or the sharing mode, designated from the user terminal 300. For example, the processor 101 detects that the current mode of the user terminal 300 (first communication device) to which an input voice signal S11 (first input voice signal) including the command voice signal S10 is input is the sharing mode (second mode), based on the reading result (NO in Act 21). Further, if it is detected that the user terminal 300 is an input terminal of the input voice signal S11 including the command voice signal S10 (YES in Act 22), the processor 101 performs the process of synthesizing a response voice signal S31 and a call voice signal S22 according to the command voice signal S10 included in the input voice signal S11 and generates an output voice signal S42 (second output voice signal) including the response voice signal S31 and the call voice signal S22 (Act 26). The call voice signal S22 is a voice signal sent from the other user terminal 300 without the input voice signal S11. The processor 101 outputs the output voice signal S42 to the auxiliary memory device 103 and the auxiliary memory device 103 stores the corresponding output voice signal S42 (Act 28).

If it is detected that the current mode of the terminal to which the command voice signal S10 is input is the sharing mode (NO in Act 21), and it is detected that the user terminal 300 is the other terminal other than the input terminal of the input voice signal S11 including the command voice signal S10 (NO in Act 22), the processor 101 performs the process of synthesizing the input voice signal S11 and a call voice signal S21 and generates an output voice signal S41 including the input voice signal S11 and the call voice signal S21 (Act 23). Further, the processor 101 performs the process of synthesizing the response voice signal S31 and the call voice signal S22 and generates an output voice signal S22 including the response voice signal S31 and the call voice signal S22 (Act 26). The call voice signals S21 and S22 are voice signals sent from the other user terminal 300 without the input voice signal S11, and the call voice signal S22 is a voice signal generated at the timing after the call voice signal S21. The processor 101 outputs the output voice signals S41 and S42 to the auxiliary memory device 103 and the auxiliary memory device 103 stores the corresponding output voice signals S41 and S42 (Act 28).

The processor 101 acquires the current mode designated from the user terminal 300, that is, the personal mode or the sharing mode. For example, the processor 101 detects that the current mode of the terminal to which the command voice signal S10 is input is the personal mode (first mode) (YES in Act 21). The processor 101 performs the process of synthesizing a command-excluded voice signal S12 obtained by excluding the command voice signal S10 from the input voice signal S11 and the call voice signal S21 and generates the output voice signal S43 (first output voice signal) including the command-excluded voice signal S12 and the call voice signal S21 (Act 24). If it is detected that the user terminal 300 is the terminal to which the command voice signal S10 is input (YES in Act 25), the processor 101 performs the process of synthesizing the response voice signal S31 and the call voice signal S22 according to the command voice signal S10 and generates the output voice signal S42 including the response voice signal S31 and the call voice signal S22 (Act 26). The processor 101 outputs the output voice signal S42 to the auxiliary memory device 103, and the auxiliary memory device 103 stores the corresponding output voice signal S42 (Act 28).

If it is detected that the user terminal 300 is the terminal other than the terminal to which the command voice signal S10 is input (NO in Act 25), the processor 101 performs the process of synthesizing a blank voice signal S32 substituted with the response voice signal S31 according to the command voice signal S10 of the virtual assistant and the call voice signal S22 and generates an output voice signal S44 including the blank voice signal S32 and the call voice signal S22 (Act 27). The processor 101 outputs the output voice signals S43 and S44 to the auxiliary memory device 103, and the auxiliary memory device 103 stores the corresponding output voice signals S43 and S44 (Act 28).

In addition, the response voice signal S31 in the process of Act 26 can be obtained by causing the communication interface 104 to transmit the command voice signal S10 including a question or an instruction to the virtual assistant to the virtual assistant server 200, causing the processor 201 to generate a response voice signal 31 according to the command voice signal S10, and causing the communication interface 104 to receive the corresponding response voice signal 31.

If it is detected that the terminal to which the command voice signal S10 is input is in the personal mode, and is not the other terminal other than the terminal to which the command voice signal S10 is input, the processor 101 acquires the output voice signals S43 and S44 stored in the auxiliary memory device 103 (Act 29). The processor 101 instructs the communication interface 104 to transmit the output voice signals S43 and S44 to the communication interfaces 304 of the other terminals that participate in the online conference (Act 30), and the communication interface 104 transmits the output voice signals S43 and S44 to the designated user terminal 300.

If it is detected that the user terminal 300 to which the command voice signal S10 is input is in the personal mode and is the terminal to which the command voice signal S10 is input, the processor 101 acquires the output voice signal S42 stored in the auxiliary memory device 103 (Act 29). The processor 101 instructs the communication interface 104 to transmit the output voice signal S42 to the communication interfaces 304 of the terminals that participate in the online conference (Act 30), and the communication interface 104 transmits the output voice signal S42 to the designated user terminal 300.

If it is detected that the terminal to which the command voice signal S10 is input is in the sharing mode and is the other terminal other than the terminal to which the command voice signal S10 is input, the processor 101 acquires the output voice signals S41 and S42 stored in the auxiliary memory device 103 (Act 29). The processor 101 instructs the communication interface 104 to transmit the output voice signals S41 and S42 to the communication interfaces 304 of the other terminals that participate in the online conference (Act 30), and the communication interface 104 transmits the output voice signals S41 and S42 to the designated user terminal 300.

If it is detected that the user terminal 300 to which the command voice signal S10 is input is in the sharing mode and is the terminal to which the command voice signal S10 is input, the processor 101 acquires the output voice signal S42 stored in the auxiliary memory device 103 (Act 29). The processor 101 instructs the communication interface 104 to transmit the output voice signal S42 to the communication interfaces 304 of the terminals that participate in the online conference (Act 30), and the communication interface 104 transmits the output voice signal S42 to the designated user terminal 300.

If the terminal to which the command voice signal S10 is input is in the personal mode, the other user terminals 300 other than the terminal to which the command voice signal S10 is input outputs the output voice signals S43 and S44 received by the communication interface 304 as a voice, by using the output device 306. In addition, if the terminal to which the command voice signal S10 is input is in the sharing mode, the other user terminals 300 other than the terminal to which the command voice signal S10 is input outputs the output voice signals S41 and S42 received by the communication interface 304 as a voice, by using the output device 306. If the plurality of other user terminals 300 participate in the online conference, the operation is performed for each of the user terminals 300.

For example, the communication interface 104 receives an input voice signal S51 (second input voice signal) transmitted from the communication interface 304 of the user terminal 300 (second communication device) while participating in the online conference. The processor 101 performs the process of synthesizing the command-excluded voice signal S12 and the call voice signal S21 (including the input voice signal S51) based on the designation of the personal mode and generates the output voice signal S43. In addition, the processor 101 performs the process of synthesizing the response voice signal S31 and the call voice signal S22 (including the input voice signal S11 and the input voice signal S51) based on the designation of the sharing mode and generates the output voice signal S42.

According to the embodiment, the conference server 100 restricts the transmission destination of the response voice signal according to the command voice signal. In addition, the conference server 100 outputs the output voice signal according to the personal mode or the sharing mode designated by the user terminals 300 that participate in the online conference. The conference server 100 outputs the call voice signal for calling the virtual assistant and the output voice signal not including the response voice signal from the virtual assistant to the other user terminals 300 other than the user terminal 300 that designates the personal mode, based on the personal mode. In addition, the conference server 100 outputs the call voice signal for calling the virtual assistant and the output voice signal including the response voice signal from the virtual assistant to the other user terminals 300 other than the user terminal 300 that designates the sharing mode based on the sharing mode. Whether the other users can hear the conversational exchange with the virtual assistant can be selected by voice signal output control by the conference server 100. Accordingly, it is possible to prevent other users from hearing a content that is not desired to be heard or that may hinder the progress of the online conference. In addition, it is possible to check whether the other user terminals 300 that participate in the predetermined online conference are in the personal mode or the sharing mode by the display of the first and second screens displayed by the user terminal 300.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conference server, comprising:
a processor configured to acquire a response voice signal according to a command voice signal included in a first input voice signal transmitted from a first communication device that participates in an online conference and output a first output voice signal including a command-excluded voice signal obtained by excluding the command voice signal from the first input voice signal; and
a communication interface configured to receive the first input voice signal transmitted from the first communication device, transmit the response voice signal to the first communication device, and transmit the first output voice signal to another communication device that participates in the online conference,
the processor determines whether a first mode or a second mode is designated from the first communication device,
wherein the processor outputs the first output voice signal based on a designation of the first mode and outputs a second output voice signal including the first input voice signal and the response voice signal based on a designation of the second mode, and
the communication interface transmits the first output voice signal to the another communication device based on the designation of the first mode and transmits the second output voice signal to the another communication device based on the designation of the second mode,
wherein the communication interface receives a second input voice signal transmitted from a second communication device that participates in the online conference, and
the processor outputs the first output voice signal including the command-excluded voice signal and the second input voice signal based on the designation of the first mode and outputs the second output voice signal including the first input voice signal, the second input voice signal, and the response voice signal based on the designation of the second mode.

2. The conference server according to claim 1,
wherein the processor acquires the response voice signal output from an assistant program that responds to the command voice signal.

3. The conference server according to claim 1,
wherein the online conference is an online video conference.

4. The conference server according to claim 1,
wherein the first communication device and the another communication device are in physically different geographic locations.

5. The conference server according to claim 1, further comprising:
a voice recognition and command voice signal detection component that detects a waveform of the first input voice signal and recognize the waveform as a recognized voice waveform.

6. The conference server according to claim 5, wherein the voice recognition and command voice signal detection component that analyzes the recognized voice waveform and detects a command voice signal when a specific voice signal is received.

7. A conference system, comprising:
a first server and a second server,
wherein the first server includes
a first processor configured to acquire a response voice signal according to a command voice signal included in a first input voice signal transmitted from a first communication device that participates in an online conference and output a first output voice signal including a command-excluded voice signal obtained by excluding the command voice signal from the first input voice signal, and
a first communication interface configured to receive the first input voice signal transmitted from the first communication device, transmit the command voice signal to the second server, receive the response voice signal from the second server, transmit the response voice signal to the first communication device, and transmit the first output voice signal to another communication device that participates in the online conference, and
the second server includes
a second processor configured to output the response voice signal based on the command voice signal, and
a second communication interface configured to receive the command voice signal transmitted from the first server and transmit the response voice signal to the first server,
the processor determines whether a first mode or a second mode is designated from the first communication device,
wherein the first processor outputs the first output voice signal based on a designation of the first mode and outputs a second output voice signal including the first input voice signal and the response voice signal based on a designation of the second mode, and
the first communication interface transmits the first output voice signal to the another communication device based on the designation of the first mode and transmits the second output voice signal to the another communication device based on the designation of the second mode,
wherein the second communication interface receives a second input voice signal transmitted from a second communication device that participates in the online conference, and
the first processor outputs the first output voice signal including the command-excluded voice signal and the second input voice signal based on the designation of the first mode and outputs the second output voice signal including the first input voice signal, the second input voice signal, and the response voice signal based on the designation of the second mode.

8. The conference system according to claim 7,
wherein the first processor acquires the response voice signal output from an assistant program that responds to the command voice signal.

9. The conference system according to claim 7,
wherein the online conference is an online video conference.

10. The conference system according to claim 7,
wherein the first communication device and the another communication device are in physically different geographic locations.

11. The conference system according to claim 7, wherein the first processor further comprises:
a voice recognition and command voice signal detection component that detects a waveform of the first input voice signal and recognize the waveform as a recognized voice waveform.

12. A method for causing a computer to perform functions including:
acquiring, by a processor, a response voice signal according to a command voice signal included in a first input voice signal transmitted from a first communication device that participates in an online conference; and
outputting, by the processor, a first output voice signal including a command-excluded voice signal obtained by excluding the command voice signal from the first input voice signal,
storing a first mode and a second mode designated from the first communication device,
outputting the first output voice signal based on a designation of the first mode and outputting a second output voice signal including the first input voice signal and the response voice signal based on a designation of the second mode,
transmitting the first output voice signal to another communication device based on the designation of the first mode and transmits the second output voice signal to the another communication device based on the designation of the second mode,
receiving a second input voice signal transmitted from a second communication device that participates in the online conference, and
outputting the first output voice signal including the command-excluded voice signal and the second input voice signal based on the designation of the first mode and outputting the second output voice signal including the first input voice signal, the second input voice signal, and the response voice signal based on the designation of the second mode.

13. The method according to claim 12, further comprising:
receiving the first input voice signal transmitted from the first communication device;
transmitting the response voice signal to the first communication device; and
transmitting the first output voice signal to another communication device that participates in the online conference.

14. The method according to claim 12, further comprising:
acquiring the response voice signal output from an assistant program that responds to the command voice signal.

* * * * *